3,634,305
WATER-SOLUBLE COMPOSITIONS RESISTANT TO SHEAR DEGRADATION OF THE POLYMER THEREOF
Alvin C. Johnson, Mount Carmel, Ill., and Clyde G. Inks, Taylor, Mich., assignors to Wyandotte Chemicals Corporation, Wyandotte, Mich.
No Drawing. Filed Aug. 8, 1969, Ser. No. 848,742
Int. Cl. C08g *51/24, 57/34;* E21b *43/22*
U.S. Cl. 260—33.4 R                     5 Claims

ABSTRACT OF THE DISCLOSURE

Aqueous polymeric solutions are prepared by admixing an aqueous solvent with water-soluble composition of a solid, high molecular weight polyethylene oxide or polyacrylamide dispersed in a water-soluble liquid surfactant. The aqueous solutions, which have utility in waterflood processes and the like, can be forcibly displaced by a pump or the like without shear degradation of the polymer component thereof.

---

The present invention relates to polymer compositions and more particularly to aqueous solutions thereof. Even more particularly, the present invention concerns aqueous polymeric solutions which do not undergo shear degradation when forcibly displaced.

A variety of solid, water-soluble, high molecular weight synthetic polymers, such as polyacrylamides, polysaccharides, polyethylene oxide and the like, have been developed which when dissolved in aqueous solutions exhibit excellent thickening and flocculating properties. Such properties have rendered these polymers extremely useful in an increasing number of commercial applications, such as, for example, textile sizing and warping processes, aqueous fluid drive systems for secondary and teritary oil recovery, sewage treatment and the like. However, a major drawback occurs with aqueous solutions of these synthetic polymers in those processes which require the forcible displacement of the solutions. When aqueous solutions of these synthetic solid polymers are subjected to the physical forces exerted by mechanical pumps and the like, the polymers undergo shear degradation. Thus, when the polymers are admixed and dissolved in an aqueous solvent and are then forced through a high pressure pump the polymers degrade. Shear degradation of the polymers reduces their molecular weight and therefore their thickening and flocculating capabilities. Examples of the commercial applications where this problem is extremely deleterious is the aforementioned oil recovery processes.

Generally speaking, secondary and teritary oil recovery processes consist in introducing by mechanical means, such as, a high pressure pump, positive displacement pump, or the like, an aqueous medium into one or more injection wells which penetrate the strata of a so-called "depleted" oil bearing formation, and forcing the medium through the formation to one or more producing wells.

In order to avoid fingering and to insure that the medium will flow through the formation in a plane front, it is normally provided that the forward front of the waterflood is of greater viscosity than the residual petroleum in the formation. To accomplish this, any one of the hereinabove enumerated polymers are dissolved in the waterflooding medium, which is usually either water or brine, and is then introduced into the formation by the above-described process. However, when these polymers are forcibly displaced into the formation, by a pump or the like, as hereinbefore noted, the polymer degrades.

The problem cannot be rectified by merely introducing the solid polymer into the aqueous solvent either just prior to encountering the displacement means or downstream therefrom because solid polymers cannot be easily injected into and dispersed in flowing aqueous media. This is especially true in flowing media under high pressure.

Thus, it is an object of the present invention to provide a novel, water-soluble polymeric composition and an aqueous solution thereof. It is another object of the present invention to provide an aqueous polymeric solution which can be displaced without degrading the polymer contained therein. Still another object of the present invention is to provide aqueous polymeric solutions useful in waterflooding oil recovery processes. It will become apparent to those skilled in the art to which the present invention pertains that these and other objects are achieved by the present invention from a consideration of the following detailed description and specific embodiments thereof.

In accordance with the present invention, there is provided a novel, water-soluble composition comprising a solid, synthetic, high molecular weight, water-soluble polymer dispersed in a water-soluble liquid surfactant. More particularly, the present invention contemplates a water-soluble composition prepared by dispersing a high molecular weight polymer, such as, polyacrylamide, polysaccharide, polyethylene oxide and the like, preferably polyethylene oxide, in a nonionic, water-soluble liquid surfactant. As used herein and in the appended claims, the terms "high molecular weight polymer" and "high molecular weight polyethylene oxide" denote those synthetic polymers having an average molecular weight of from 500,000 to several million, and preferably from one million to ten million. These polymers, which are commercially available, are generally solid, granulated particles which are water-soluble in effective concentrations ranging from about 20 p.p.m. to 50,000 p.p.m. At higher concentrations the solution of polymer and water is gelatinous.

The surfactants contemplated as dispersing media are those water-soluble, nonionic, liquid surfactants which generally comprise oxyalkylated adducts of hydrophobic polyols. Such surfactants are widely known and commercially available. They are generally prepared by reacting in the presence of an oxyalkylation catalyst, such as, potassium hydroxide, an alkylene oxide and a polyhydric compound. The alkylene oxides employed in the preparation of the surfactants are the 1,2-alkylene oxides having from 2 to 4 carbon atoms, such as ethylene oxide, propylene oxide, 1,2-butylene oxide and mixtures thereof.

Representative of the polyhydric compounds employed in the preparation of the surfactants are aliphatic polyols and alkylene oxide adducts thereof, alkylene oxide adducts of polyhydric thioethers, polyacetals, aliphatic thiols, ammonia, amines, including aromatic, aliphatic and heterocyclic amines and alkylene oxide adducts thereof, and mixtures thereof. Other suitable compounds include polyhydroxyl-containing polyesters; polyalkylene polyether polyols and polyhydroxyl-containing phosphorus compounds. Compounds which contain two or more different groups within the above-defined classes may also be used such as amino alcohols, compounds which contain an —SH group and an —OH group as well as compounds which contain an amino group and an —SH group.

Surfactants contemplated for use herein comprise the oxypropylated and oxyethylated adducts of hydrophobic polyols. Among the preferred surfactants are those which can be represented by the formula:

$$Y[(C_3H_6O)_n(C_2H_4O_7)_mH]_x$$

wherein Y is the residue of an organic compound having from about two to six carbon atoms and containing $x$ reactive hydrogen atoms in which $x$ has a value of at least two, $n$ has a value such that the molecular weight of the polyoxypropylene base is at least 900 and no more than about 4000 and $m$ has a value such that the oxyethylene content of the molecule is from about 10 to 90 weight percent. Compounds defined by Y include, for example, propylene glycol, glycerine, pentaerythritol, trimethylolpropane, ethylenediamine, triethylenetetramine, triisopropanolamine and butylamine. These compounds are more particularly described in U.S. Pat. Nos. 2,674,619 and 2,979,528.

Another preferred class of nonionic liquid surfactants are the oxyalkylated adducts of higher aliphatic alcohols having from 8 to 22 carbon atoms in the aliphatic portion. Representative of this class of preferred surfactants are (1) the propylene oxide adducts of condensates of ethylene oxide and the higher alcohols and (2) products prepared by condensing a mixture of ethylene oxide and propylene oxide with the higher alcohols. These surfactants generally comprise by weight from about 40% to 80% of ethylene oxide and have a molecular weight ranging from about 400 to about 1,000. These surfactants are more particularly described in U.S. Pat. No. 3,340,309.

Still another class of preferred surfactants are the polyoxyalkylene compounds having heteric polyoxyethylene chains. These compounds can be structurally represented as:

$$Y(-P-E-H)_x$$

wherein Y is the nucleus of an organic reactive hydrogen compound containing $x$ reactive hydrogen atoms and having up to six, inclusive, carbon atoms, $x$ is an integer, P is a hydrophobic polyoxyalkylene chain having an oxygen/carbon atom ratio of not more than 0.40, the molecular weight of P and the value of $x$ being such that the molecule, excluding E, has a molecular weight of at least about 400 to 900 and up to about 25,000 and E is a hydrophilic heteric polyoxyalkylene chain which (1) contains oxyethylene groups and at least five precent by weight of higher molecular weight oxyalkylene groups having at least three carbon atoms in their structure, and (2) has an average oxygen/carbon atom ratio of greater than 0.40, E being present in the composition to the extent that it constitutes from 5 to 90 weight percent of the total composition. These compositions are more particularly described in U.S. Pat. No. 3,101,374.

The present compositions are prepared by dispersing from about 2% to 92% by weight of the solid polymer, based on the total weight of the composition, in the surfactant. Preferably, the compositions comprise from about 12% to 15% by weight of polymer and from about 85% to 88% by weight of surfactant. Thus, in preparing these compositions it is desirable to employ a surfactant to polymer weight ratio of about 0.05:1 to 49:1 and preferably from about 6:1 to 8:1.

Aqueous polymeric solutions utilizing these compositions are prepared by admixing an aqueous solvent, generally water or a brine solution containing up to 5% of a salt (predominantly NaCl) therewith. The compositions are admixed with the solvent in concentrations ranging from about 40 p.p.m. to 50,000 p.p.m., preferably from 1,000 p.p.m. to 40,000 p.p.m. Stated another way, the aqueous polymeric solutions contemplated herein generally comprise, by weight, from about 0.004% to 5.0% of the water soluble composition and from 95.0% to 99.996% of aqueous solvent. As hereinbefore mentioned, the polymer component of the aqueous polymeric solutions prepared in accordance herewith does not degrade under the shearing forces exerted by displacement means.

Although not wishing to be bound by any theory, it appears that one reason for this unexpected property, i.e., nonshearing of the polymer, is attributable to a "time delay" effect. The surfactant has a higher solubility rate than the polymer and thus solubilizes or dissolves before the polymer does. Solubilizing of the surfactant, in turn, inhibits the solubilizing of the polymer in the aqueous solvent for a sufficient period of time to allow the solid polymer to be forced through the displacement means without being sheared. Only after passing through the displacement means does the polymer begin to dissolve in the solution.

Additionally, the surfactant, being water-soluble, disperses the polymer particles in the aqueous solvent, thereby preventing the formation of large hydrated lumps or an agglomeration of the polymer in the solvent. This is highly desirable since the small particles will dissolve in the aqueous solvent much more rapidly than large hydrated lumps.

Thus, the present compositions are seen to provide not only a means for preventing the shear degradation of the polymer but also as a means for readily dispersing the polymer in aqueous solvents to provide aqueous polymer solutions thereof.

Moreover, since the present compositions are essentially a liquid, they can easily be introduced into a flowing aqueous medium. Introduction of the composition into the medium can occur on either the low pressure side or high pressure side of a system and without the fear of the polymer being degraded. This is, of course, extremely advantageous in situations where it is necessary or desirable to introduce a polymer downstream from a displacement means since this cannot be easily accomplished with a solid polymer alone.

The following examples, which are not to be construed as unduly limitative of the present invention, set forth specific embodiments thereof. In each of the examples, viscosity data was obtained using a Brookfield viscosimeter set at 60 r.p.m. In each recorded figure reported in the data, a 0.4 Brookfield factor has been subtracted therefrom. The water used to make up each sample in the pipeline tests contained about 100 p.p.m. of NaCl and was obtained from the Ernst waterflood located in Spencer County, Ind. In the examples, all parts, unless otherwise indicated, are by weight.

EXAMPLE I

A composition was prepared consisting of 1,645 parts of a solid, high molecular weight polyethylene oxide dispersed in 11,515 parts of a surfactant. The surfactant consisted of the product prepared by reacting ethylene oxide with polyoxypropylene glycol under oxyalkylation conditions. The total molecular weight of the surfactant was about 3,000 of which about 40% was ethylene oxide. The weight ratio of surfactant to polymer was 7:1.

The composition was injected with an Alemite lube gun operatively connected to a 400 foot length of 2" pipeline, adjacent to and on the low pressure side of a conventional positive displacement pump disposed midway in the pipeline. The pump, a Triplex pump, was operated by a 25 horsepower motor, had a 3½" base with a pressure of 380 p.s.i. on the low side and 580 p.s.i. on the high side.

The composition was injected into the pipeline and admixed with flowing water in a concentration of 13,160 p.p.m.

After being forced through the pump, two samples of the aqueous solution were withdrawn from the pipeline downstream from the pump. Three viscosity measurements were then taken for each sample to ensure that no erroneous values were obtained. The results of these tests were as follows:

| Sample | Reading 1 | Reading 2 | Reading 3 |
|---|---|---|---|
| 1 | 2.78 | 2.76 | 2.77 |
| 2 | 2.76 | 2.77 | 2.76 |

A similar solution was then prepared in a laboratory using distilled water containing about 100 p.p.m. of NaCl. When the solution was tested for viscosity without being subjected to any shear forces, the following results were obtained:

| Sample | Reading 1 | Reading 2 | Reading 3 |
|---|---|---|---|
| 3 | 2.78 | 2.76 | 2.77 |
| 4 | 2.76 | 2.77 | 2.77 |

A comparison of the two sets of data shows that the composition effectively inhibits shear degradation of the polymer when an aqueous solution thereof is forcingly displaced.

EXAMPLE II

This example evidences the fact that the present compositions inhibits shear degradation of polyethylene oxide as it flows through a pipeline as well as the capability of the composition to be injected downstream of high pressure displacement means. A composition was prepared consisting of 2,305 parts of polyethyelne oxide dispersed in 16,135 parts of a surfactant. The surfactant employed consisted of the product prepared by reacting ethylene oxide with polyoxypropylene glycol. The total molecular weight of the surfactant was about 3,000 of which about 40% was ethylene oxide. This composition was then injected into the pipeline of Example I, but on the high pressure side of the pump, that is, downstream from the pump, and admixed with water. The concentration of the composition in the water was 18,440 parts by weight per million parts by weight of water. Approximately 200 feet downstream from the injection point, two samples of the aqueous polymeric solution were taken from the pipeline and analyzed for viscosity with a Brookfield viscosimeter. The results of these tests were as follows:

| Sample | Reading 1 | Reading 2 | Reading 3 |
|---|---|---|---|
| 5 | 5.13 | 5.13 | 5.13 |
| 6 | 4.81 | 4.80 | 4.80 |

When a similar laboratory solution which was not flowed through a pipeline but rather was allowed to just sit for approximately one hour, was tested for viscosity with a Brookfield viscosimeter, the following results were obtained:

| Sample | Reading 1 | Reading 2 | Reading 3 |
|---|---|---|---|
| 7 | 4.90 | 4.90 | 4.90 |
| 8 | 4.91 | 4.90 | 4.90 |

It can be seen from a comparison of the samples that little or no shear degradation of the polymer occurred as it flowed through the pipeline.

EXAMPLE III

An attempt was made to introduce solid polyethylene oxide into a flowing aqueous stream by the procedure of Example I. However, the solid polymer could not be injected into the stream. Thus, to evidence the shear degradation of the polyethylene oxide it was necessary to first dissolve it in water and thereafter admix it with a flowing aqueous stream.

A 1.3% by weight aqueous solution of polyethylene oxide was prepared by dissolving six pounds of the polymer in 55 gallons of water (458 pounds). Thereafter, using the apparatus of Example I, 1 barrel (42 gallons) of the solution was injected into a flowing stream of 20 barrels of water on the low pressure side of the pump. This provided a concentration of polymer in water of about 860 p.p.m.

Samples of the solution were drawn from the pipeline on the high pressure side and analyzed for viscosity. The results were as follows:

| Sample: | Reading, in cps. |
|---|---|
| 9 | 1.88 |
| 10 | 1.99 |

A laboratory test sample of an aqueous solution having a concentration of 860 p.p.m. of polyethylene oxide dissolved therein, when tested for viscosity, gave the following results:

| Sample: | Reading |
|---|---|
| 12 | 2.36 |

It can be seen from a comparison of the data, that the forcible displacement of the polymer resulted in a drastic reduction of the viscosity of the solution.

What is claimed is:

1. A water soluble composition comprising (1) from 2 to 92% by weight of a synthetic, water-soluble, solid polymer having an average molecular weight above 500,000 and selected from the group consisting of polyacrylamides, and polyethylene oxide, the polymer being useful in concentrations ranging from 20 to 50,000 p.p.m., the polymer being dispersed in (2) from about 8 to 98% by weight of a liquid surfactant, said surfactant comprising an oxyalkylated adduct of a hydrophobic polyol and selected from the group consisting of (a) a compound corresponding to the formula:

$$Y[(C_3H_6O)_n(C_2H_4O)_mH]_x$$

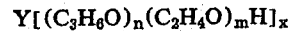

wherein Y is the residue of an organic compound having from about two to six carbon atoms and containing $x$ reactive hydrogen atoms in which $x$ has a value of at least two; $n$ has a value such that the molecular weight of the polyoxypropylene base is at least 900 and no more than about 4000 and $m$ has a value such that the oxyethylene content of the molecule is from about 10 to 90 weight percent, (b) the adducts of higher aliphatic alcohols having from 8 to 22 carbon atoms in the aliphatic portion with ethylene oxide, propylene oxide or mixtures thereof, the adducts comprising from about 40% to 80% by weight of ethylene oxide and having a molecular weight ranging from about 400 to about 1000, and (c) compounds corresponding to the formula:

$$Y(-P-E-H)_x$$

wherein Y is the nucleus of an organic reactive hydrogen compound containing $x$ reactive hydrogen atoms and having up to six, inclusive, carbon atoms, $x$ is an integer, P is a hydrophobic polyoxyalkylene chain having an oxygen/carbon atom ratio of not more than 0.40, the molecular weight of P and the value of $x$ being such that the molecule, excluding E, has a molecular weight of at least 400 to 900 and up to about 25,000, and E is a hydrophilic heteric polyoxyalkylene chain which (1) contains oxyethylene groups and at least five percent by weight of higher molecular weight oxyalkylene groups having at least three carbon atoms in their structure, and (2) has an average oxygen/carbon atom ratio of greater than 0.40, E being present in the composition to the extent that it constitutes from 5 to 90 weight percent of the total composition.

2. The composition of claim 1 wherein said polymer is polyethylene oxide.

3. The composition of claim 1 wherein said surfactant is the compound corresponding to the formula:

$$Y[(C_3H_6O)_n(C_2H_4O)_mH]_x$$

4. The composition of claim 2 wherein said composition comprises by weight:
   (a) from about 12 to 15% of said polyethylene oxide, and
   (b) from about 85 to 88% of said surfactant.

5. The composition of claim 4 wherein the weight ratio of said surfactant to said polyethylene oxide ranges from about 0.05:1 to 49:1.

References Cited
UNITED STATES PATENTS

| | | | |
|---|---|---|---|
| 2,662,031 | 12/1953 | Vogel et al. | 106—287 |
| 2,674,619 | 4/1954 | Lundsted | 260—615 B |
| 2,677,700 | 5/1954 | Jackson et al. | 260—615 B |
| 3,108,891 | 10/1963 | Charon et al. | 106—213 |
| 3,336,977 | 8/1967 | Amott | 166—9 |
| 3,452,817 | 7/1969 | Fallgatter | 166—305 |

ALLAN LIEBERMAN, Primary Examiner

U.S. Cl. X.R.

106—162; 166—273, 274, 275; 260—29.2 EP, 29.6 ME